(12) United States Patent
Fricke et al.

(10) Patent No.: US 7,609,442 B2
(45) Date of Patent: Oct. 27, 2009

(54) SYNCHRONIZING SCREEN

(75) Inventors: Peter James Fricke, Corvallis, OR (US); Timothy Emmerich, Corvallis, OR (US); Gregory J. May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 572 days.

(21) Appl. No.: 11/250,068

(22) Filed: Oct. 13, 2005

(65) Prior Publication Data

US 2007/0085977 A1    Apr. 19, 2007

(51) Int. Cl.
*G03B 21/56* (2006.01)
(52) U.S. Cl. .................... 359/443; 359/449; 345/207
(58) Field of Classification Search ............ 359/443, 359/449, 459; 353/84, 79; 345/27, 207
See application file for complete search history.

(56) References Cited

U.S. PATENT DOCUMENTS

| | | | |
|---|---|---|---|
| 4,945,413 A | 7/1990 | Merval | |
| 5,193,015 A | 3/1993 | Shanks | |
| 5,570,108 A | 10/1996 | McLaughlin | |
| 5,914,757 A | 6/1999 | Dean | |
| 6,023,264 A | 2/2000 | Gentile | |
| 6,246,446 B1 | 6/2001 | Heimbuch | |
| 6,483,643 B1 | 11/2002 | Zuchowski | |
| 6,538,814 B2 | 3/2003 | Hunter | |
| 6,674,579 B2 | 1/2004 | Brennesholtz | |
| 6,680,579 B2 | 1/2004 | Allen | |
| 6,788,469 B2 | 9/2004 | Dewald | |
| 6,853,486 B2 | 2/2005 | Cruz-Uribe | |
| 6,888,529 B2 * | 5/2005 | Bruning et al. | ............. 345/102 |
| 7,311,404 B2 * | 12/2007 | Hori | ............................ 353/84 |
| 7,329,009 B2 * | 2/2008 | Monch et al. | .................. 353/85 |
| 2001/0028501 A1 | 10/2001 | Hunter | |
| 2002/0147861 A1 | 10/2002 | Bui | |
| 2003/0128337 A1 | 7/2003 | Jaynes | |
| 2003/0193565 A1 | 10/2003 | Wen | |
| 2004/0012849 A1 | 1/2004 | Cruz-Uribe | |
| 2004/0095558 A1 | 5/2004 | Whitehead | |
| 2007/0091055 A1 * | 4/2007 | Sakuda | ....................... 345/102 |

* cited by examiner

*Primary Examiner*—Christopher Mahoney

(57) ABSTRACT

Embodiments of synchronizing modification of an optical characteristic of a screen are disclosed.

29 Claims, 6 Drawing Sheets

SYNCHRONIZING SCREEN

BACKGROUND

Typical front projection systems may provide images that are less desirable than those provided by other projection systems. For example, when a front projection system is used in an environment with ambient light (such as a bright room), projected images may be displayed with an undesirably low contrast. Hence, current front projection implementations may provide unacceptable images when used in the presence of ambient light.

BRIEF DESCRIPTION OF DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Various embodiments for synchronizing modification of a characteristic, such as an optical characteristic, of a screen are described. In one embodiment, the modification of an optical characteristic of a screen is synchronized based on the timing of a color component of light (such as red, green, or blue in one embodiment) projected onto a sensor (or color component of light incident on the sensor, such as that provided by ambient lighting). The sensor (such as a color sensor) may be provided proximate to the screen, so that the light incident on the sensor is similar to that incident on the screen, to determine when and/or how much the screen's optical characteristic may be modified. The optical characteristic that is modified may be the screen's reflectivity and/or absorbance.

Figure 1:
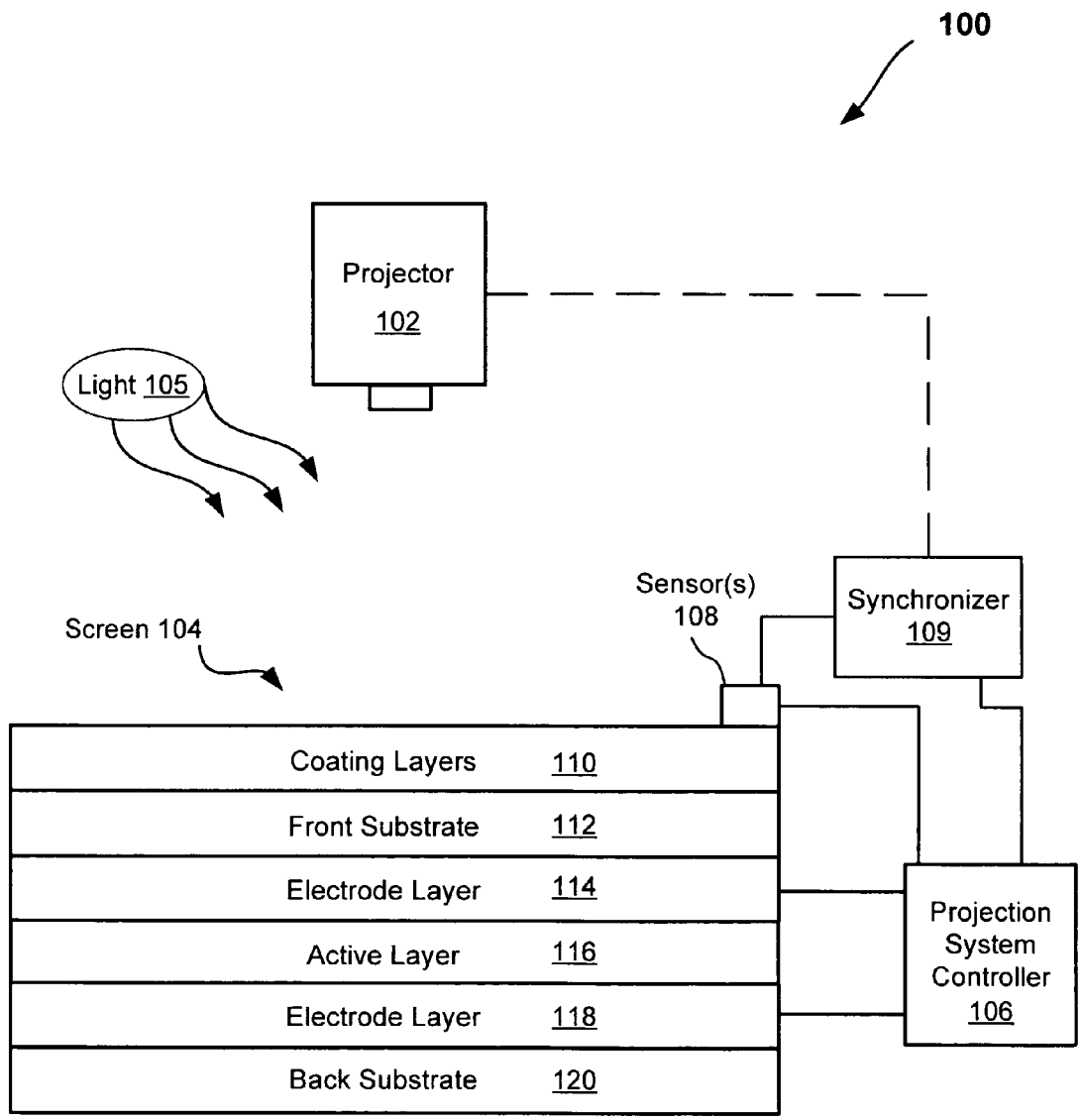
FIG. 1 illustrates a block diagram of an embodiment of a front projection system, according to an embodiment.

FIG. 1 illustrates a block diagram of an embodiment of a front projection system 100, according to an embodiment. The front projection system 100 includes a projector 102 to project images on an embodiment of a screen, such as screen 104. The projector 102 may be any suitable digital projector such as a color front projector. The screen 104 may also receive light rays from other sources (105), such as ambient light. As illustrated in FIG. 1, the system 100 may further include an embodiment of a controller, such as projection system controller 106. Moreover, even though FIG. 1 illustrates a front projection system (100), the techniques discussed herein may be applied to a rear projection system. For example in a rear projection screen system, the transmissiveness of the screen may be modified.

The screen 104 may be an active projection screen with a modifiable optical characteristic, e.g., that is capable of assuming multiple reflectivity and/or absorbance states. The multiple reflectivity and/or absorbance states may provide a higher contrast ratio in the presence of ambient light and/or a color projected on the screen 104 by the projector 102 than would otherwise be obtained, as is further discussed herein. The projection system controller 106 may coordinate the operation of the projector 102 and the screen 104.

The system 100 further includes one or more sensors 108 that may be proximate to the screen 104 (such as illustrated in FIG. 1). In one embodiment, the projection system controller 106 may communicate with the sensor 108. Also, the system 100 may include a synchronizer 109 that utilizes data from the sensor 108 to determine when and/or how much the projection system controller 106 is to modify the screen's (104) optical characteristic.

As will be further discussed herein, e.g., with reference to the remaining figures, a synchronization signal defining system synchronization timing may be provided by the synchronizer 109 to the screen 104 (e.g., through the projection system controller 106) in a number of ways. For example, a hardwired connection between the projector 102 and the synchronizer 109 may be provided. Also, a wireless signal may be utilized. For example, an infrared (IR) signal, an ultraviolet (UV) signal, or radio frequency (RF) signal may be provided along with (or separate from) the projected image data. Alternately, the synchronizer 109 may internally generate the synchronization signal (e.g., based on data from the sensor 108 and/or projection system controller 106).

As illustrated in FIG. 1, the screen 104 may include one or more coating layers 110, a front substrate 112, an electrode layer 114, an active layer 116, an electrode layer 118, and a back substrate 120. The coating layers 110 may be one or more layers deposited on the front substrate 112 that may include an antireflective layer such as a suitable anti-glare surface treatment, an ambient rejection layer such as a plurality of optical band pass filters, one or more micro-lenses, and/or a diffuse layer. The front substrate 112 may be an optically clear and flexible material such as Polyethylene Terephthalate (PET or PETE) on which the coating layers 110 are formed. The electrode layer 114 may be formed on the bottom surface of the front substrate 112.

The electrode layer 114 may be one or more suitable transparent conductors such as Indium Tin Oxide (ITO) or Polyethylene Dioxythiophene (PEDOT). In one embodiment, the electrode layer 114 may form the top conductor(s) of the active layer 116.

The active layer 116 may be an optically and/or electrically active layer that responds to the application of light or voltage across itself with a change in its absorbance and/or reflectivity. A number of different active layers 116 may provide such a response. One example includes a polymer dispersed liquid crystal (PDLC) layer in which pockets of liquid crystal material are dispersed throughout a transparent polymer layer. In an embodiment, the active layer 116 may be a continuous dichroic-doped PDLC layer that appears white (or black) in color under a no voltage condition. In some embodiments, a chemical coating or thin film layer of electrochromic material, such as Tungsten Oxide, or photochromic material, across which an electric field may be selectively applied, may serve as the active layer 116. The application of a bias across such an electrochromic material active layer (116) may enable the screen 104 to switch from white to gray or white to clear, in which case a gray or black backer may be included. Such an embodiment may include an ITO array type of conductive layer 114 on the front or top of the screen 104 and a second conductive layer (118) on the opposite side of the active layer near the back layer.

In an embodiment, the active layer (116) may be optically active where it responds to certain wavelengths or wavelength band of light, and may or may not include a set of electrode conductive layers to apply additional voltage to the material resulting in similar control and/or response of the system. The optical response of the screen (104) may be related to the amount of visible light incident on the optically active area of the screen (104).

In an embodiment, the electrode layer 118 may be similar to the electrode layer 114 and be positioned on the back substrate 120. An opposite charge may be applied to the electrode layer 118 (e.g., relative to the charge applied to the electrode layer 114). Similarly, the back substrate 120 may be similar to the front substrate 112 in material composition but different in its position at the bottom of the stack of the screen 104, and its relatively darker color (or white if the active material is black in the non-energized state). In one embodiment, the projection system controller 106 selectively applies a voltage across the active layer 116 via the application of opposite charges to the electrode layers 114 and 118. The selective application of the voltage across the active layer 116 may enable the adjustment of the optical characteristic of the screen (104) over time and/or for a plurality of sections of the screen (104) as will be further discussed herein.

The sensors 108 may be one or more sensors that function to observe the changing color of light beams projected on the screen 104. The sensors 108 may also relate the information to projection system controller 106. The sensor 108 may be located on the screen pointed back toward the projector 102 to measure ambient light and/or projected light, or it may be located near the screen 104 pointed towards the screen surface. Alternatively, the sensor 108 may be located away from the screen 104 and pointed toward the screen 104. In one embodiment, the sensors 108 may be one or more spectrophotometers located at one or more points around the screen 104 (e.g., where the ambient light contribution or projected light levels (from the projector 102) is different for different parts of the screen 104). In an embodiment, the sensors 108 include three ambient light-sensing mechanisms, one dedicated to red ambient light, one dedicated to green ambient light, and one dedicated to blue ambient light, as is further discussed with reference to FIG. 2.

Furthermore, in one embodiment, light is projected from the projector 102 and impinges upon the screen 104. The coating layers 110 may serve to reduce specular reflection from the screen 104 by implementing an antireflection coating. The coating layers 110 may also serve to absorb and/or deflect a portion of the ambient light that may be generated by extraneous sources other than the projector 102, e.g., by implementing an ambient rejection coating. The coating layers 110 allow a portion of the light incident upon its surface to pass through (partially diffuse) to the layers underlying the coating layers 110.

In an embodiment of the front projection system 100, the active layer 116 may be a continuous PDLC layer. In such a case, the liquid crystal molecules of the active layer 116 are birefringent, and therefore have different indices of refraction depending upon their orientation. When the liquid crystal molecules are randomly oriented, they may have a different index of refraction than the surrounding polymer in which they are dispersed within the active layer 116, and the liquid crystal molecules scatter incident light in such a way that the active layer 116 appears off white (or milky white). Upon the application of a voltage between the electrode layers 114 and 118, and thereby across the active layer 116, the liquid crystal molecules align themselves and the index of refraction of the liquid crystal molecules changes to match the index of refraction of the polymer material throughout which the liquid crystal molecules are dispersed. As a result, the pockets of liquid crystals no longer substantially scatter light and the active layer 116 becomes transparent or at least substantially transparent.

With the inclusion of a black layer below the active layer 116 (e.g., coated atop the electrode layer 118, below the electrode layer 118, or atop the back substrate 120), the stacked configuration of the projection screen 104 (illustrated in FIG. 1) provides a screen that can change from milky white to black. In one embodiment, the screen 104 may include white and clear modes (referring to modes of active layer 116), where clear mode provides a view of the black/dark back layer (120). Alternatively, the screen 104 may include black and clear modes, e.g., the PDLC (116) is dyed black or dark gray. In this case, a highly reflective back layer (120) may be utilized, rather than a black layer.

In an embodiment, the projection system controller 106 analyzes image data, corresponding to an image to be produced upon screen 104, and produces two streams of data. One data stream may be supplied to the screen 104 to control the reflectivity and/or absorbance of the screen 104. The other data stream may be supplied to the projector 102 and may be used to modify the projected image data in accordance with the anticipated response of the screen 104. The projection system controller 106 further analyzes a data stream provided by the sensors 108. In an embodiment, the entirety of the screen 104 acts as a single pixel, such that the entire screen (i.e., all its pixels) may change its optical characteristic (e.g., reflectivity and/or absorbance) in response to a scene projected thereon and the ambient light incident on the screen 104. The front projection system 100 therefore may create a relatively deeper black by changing the color of the screen (104) from white to black, e.g., to provide additional dynamic range for the dark portions of the projected image.

Figure 2:
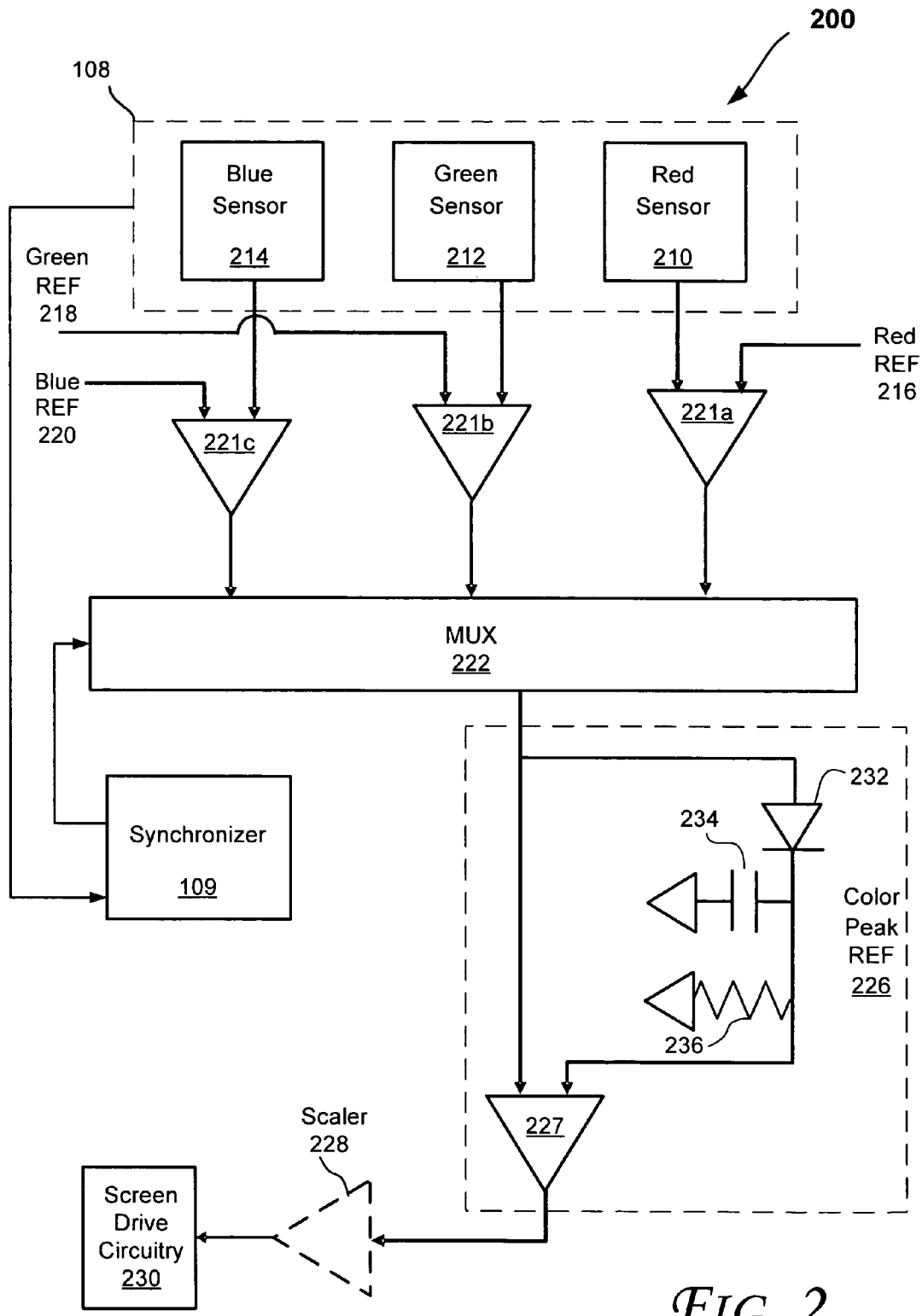
FIG. 2 illustrates a block diagram of an embodiment of a scaling circuit, according to an embodiment.

FIG. 2 illustrates a block diagram of an embodiment of a scaling circuit 200, according to an embodiment. In one embodiment, the circuit 200 illustrates further details of a portion of the projection system controller 106 of FIG. 1. The scaling circuit 200 includes an embodiment of the sensors 108. As illustrated in FIG. 2, the embodiment of the sensors 108 may include a red sensor 210, a green sensor 212, and a blue sensor 214 configured for measuring ambient light to provide an indication of the ambient light incident upon screen 104. The circuit 200 further includes a red reference 216, a green reference 218, and a blue reference 220.

The red sensor 210, green sensor 212, and blue sensor 214 may be light sensing devices that sense ambient contributions of red, green, and blue light, respectively. The red sensor 210, green sensor 212, and blue sensor 214 may be provided as spectrophotometers or other suitable light-sensing mechanisms, including spectrally-specific filtered phototransistors (including for example, three phototransistors with three separate filters (e.g., red, green, and blue (RGB)) such that each transistor senses the amount of light for each band of interest). Furthermore, the red reference 216, green reference 218, and blue reference 220 are reference signals provided for comparison to ambient levels sensed by the red sensor 210, green sensor 212, and blue sensor 214.

The sensor signals (from 210-214) and the reference signals (216-220) are provided to comparators (221a-221c). The comparators (221a-221c) provide error signals if the sensors (210-214) provide different signals than the reference signals (216-220). The results of the comparisons (performed by the comparators 221a-221c) are provided to a multiplexer (MUX) 222. The MUX 222 selects one of several input lines (from the comparators 221a-c), e.g., between the red sensor 210, green sensor 212, blue sensor 214, and red reference 216, green reference 218, and blue reference 220.

The MUX 222 is coupled to the synchronizer 109 and a color peak reference module 226. In an embodiment, the projector 102 of FIG. 1 includes a rotating color wheel (or time sequenced color from an LCD projector) having various segments such as a red segment, a green segment, a blue segment, and the like. As the color wheel rotates, its red, green, and blue segments filter the light rays originating from a visible light source (such as a projector lamp) to project a color image on the screen (104). The synchronizer 109 provides timing information regarding the color wheel, which may be provided through various suitable sensing mechanisms and communicated wirelessly, optically, or in a hardwired fashion, for example, based on data from the sensors 108 and/or from the projector 102, as will be further discussed with reference to FIG. 3.

In one embodiment, the color peak reference module 226 may provide storage for a largest value of the color detected over a time, or per rotation of the color wheel through the multiple color segments so the screen may be scaled, as will be further discussed herein. Optical sensing of color wheel timing (e.g., assuming equal timing for each color for this example) may be either through data communication from the projector (e.g., via serial infrared communication) or by sensing red, green, and blue (RGB) transitions occurring during normal data screen from a sequential-color projector. Using red as an example, if the red ambient content sensed by the red sensor 220 is higher than the calibrated value present in the red reference 216, then the output of the comparator 221a turns negative by a proportional amount. When the MUX 222 switches to a buffered red, and if the red value is larger than the other samples stored in the color peak reference module 226, then the new largest value detected (over a time that peak reference module 226 is measuring) is stored in the color peak reference module 226. The color peak reference module 226 may store the largest value detected over the time between all three colors red, green, and blue in one embodiment. Accordingly, the timing effects of each of the color segments may have an effect on the amount that color is projected. For example, for a longer green segment, the decay effect of the sample and hold capacitor on the color peak reference module 226 may be taken into account. Since the color wheels may have different color ratios between the different color segments, one embodiment may keep a constant shared sample and hold circuit (or more simply a capacitor) common between the color sensors 108 and compensate for the longer time and any decay of the sampled voltage through a lookup table or software. Another embodiment may use separate analog memory locations (such as a sample and hold circuit) for each portion of the color wheel. Each sample and hold circuit may have its own decay rate or perhaps a timing reset to refresh the most recent peak. If this is not taken into account, then the sensor readings may read lower than actual and result in color shift errors when the system reacts to the false color information.

The circuit 200 further includes a comparator 227 (which may be incorporated within the color peak reference module 226 in one embodiment), a scaler 228 that may be included in some embodiments but not others, and a screen drive circuitry 230. As illustrated in FIG. 2, the comparator 227 receives the output of the color peak reference module 226 and the output of the MUX 222, and provides the signals to the scaler 228 (e.g., for scaling the signals in accordance with the reflectance and/or absorbance characteristics of the screen 104). The scaled signal (from 228, e.g., determined from the peak reference 226 as the new largest value and the standard minimum of zero value projected) is provided to the screen 104 (e.g., through the screen drive circuitry 230). Also, the value stored in the color peak reference module 226 may slowly decay over the course of projecting frames of information (this may not be scene dependent since scenes span more than one revolution of the color wheel). Accordingly, the color peak reference module 226 may include a memory portion (e.g., having a diode 232, a capacitor 234, and a resistor 236 or alternatively a sample and hold circuit or an Analog-to-Digital converter (A-D converter) for the appropriate timing and digital memory circuitry). In addition to an A-D converter, this alternative embodiment may include a Digital to Analog converter (D-A converter) to read out the digitally stored information.

In an embodiment, all colors may be scaled (e.g., proportionally adjusted by the circuit by 200). For example, the colors may be scaled such that the screen 104 is white (which may represent the best white balance when no ambient contamination is present or when the ambient has equal color contribution for all projected colors). One example includes the situation when the ambient contributions sensed by the red sensor 210, green sensor 212, and blue sensor 214 match a predetermined ratio (which may represent values sensed by the screen sensors (108) when no ambient light is present, such as what is typically perceived by the human eye), e.g., zero or smaller than the references of the red reference 216, green reference 218, and blue reference 220. Hence, the color peak reference module 226 may provide the largest value color detected that is equal to desired projected values with no additional color ambient contamination present and drives the screen 104 to a white state (e.g., 100 percent reflectivity or 0 percent absorbance). When the other colors are less due to higher ambient contributions of a particular color, for example, the screen 104 may be driven proportionally more gray (less reflective or more absorbent) during that one color wheel segment which absorbs more of the ambient color contamination during that phase of the color wheel to at least partially compensate for the ambient color contamination.

In one embodiment, the scaling circuit 200 is an example of a circuit that may be utilized at the screen 104 to measure ambient contributions from each of the colors red, green, and blue, e.g., by using the red sensor 210, green sensor 212, and blue sensor 214. Alternately, CMY, color filter tristimulus (CIEXYZ), spectroradiometer, and/or spectrophotometer (CIEXYZ or similar) sensors may be utilized. In an embodiment, continuous auto-scaling (e.g., scaling for each turn of the color wheel where the peak values for each color are determined allowing the screen to drop to the right level of absorbing gray for the appropriate color segment) may be performed at the screen 104 by incorporating a sensor (108) that includes the red sensor 210, green sensor 212, and blue sensor 214 and continuously performs measurements of the red, green, and blue components of the light incident on sensors 210-214. The measurements may or may not include the projected image. The MUX 222 may then switch between the color error signals provided by the comparators 221a-c that are generated by the difference between the red reference 216, green reference 218, blue reference 220 and the outputs of the sensors 210-214 in unison with the color wheel timing provided by the synchronizer 109. In an embodiment, this takes into account the additional ambient light added to the image independent of the projector 102, e.g., if the sensors 108 are protected from sensing the projector light. With the projector 102, assuming no ambient light addition to the image, the circuit 200 of FIG. 2 may compensate for shifts in ambient light contribution to the image by coordinating the shift of screen reflectance and/or absorbance to the image on the color wheel. For example, when the room light adds more green than intended, then the screen 104 can shift more absorbing during the green segment of the color wheel, thereby reflecting less green back to the viewer. This may allow the screen 104 to compensate for ambient color changes.

Moreover, the image color intensity may be increased in the other color wheel segments (e.g., green and blue) by driving the screen 104 to appear white to a greater degree (more reflective or less absorbent) during those times to provide a higher intensity of color for the other color wheel segments to match the extra red across the overall screen 104. The result may be that the gray levels adjust for each color wheel segment and one color wheel segment tries to drive the screen 104 to the highest reflectivity condition to keep the reflectivity of the screen 104 relatively high. When all ambient color contributions, as measured by red sensor 210, green sensor 212, and blue sensor 214, match or are lower than the references provided by the red reference 216, green reference 218, and blue reference 220, such as the case in a dark room, the output signal of the color peak reference module 226 may be the same and equal to the output of all color sensors (210-214) resulting in the screen 104 being driven to a white state (100 percent reflective or 0 percent absorbent).

In an embodiment, a handheld colorimeter may be used and its readings can be manually or automatically input into the projection system 100 to be used as references or as a measure of current conditions in place of the data provided by the red sensor 210, green sensor 212, and blue sensor 214. Alternately, suitable color profiling portable equipment can be incorporated into the projector 102 or external to the projector 102 to provide the references for the optical characteristic changes (e.g., reflectivity and/or absorbance of the screen 104).

Accordingly, in various embodiments, by incorporating an active screen (104) capable of assuming multiple reflectivity/absorbance states, the front projection system 100 can continuously be adjusted during operation. It is envisioned that the calibration of color intensity can be performed for any type of a suitable projection screen, including multi-element and sequential color system projection screens. In sequential color systems, the screen 104 may perform the adjustment of screen reflectance to achieve intensity scaling of the colors of light forming the image per color wheel segment relative to the other color wheel segments, e.g., determining with the use of the sensor 108 and the projection system controller 106 which color is to be identified as providing the largest detected value (e.g., by peak reference module 226) such that the intensity of the other colors of the image viewed on screen 104 can be scaled by changing the reflectivity/absorbance of the screen 104 during the time window for each color. This may provide suitable scaling to render the correctly color-calibrated image. The screen 104 may then change its reflectivity/absorbance for each color wheel segment to the calibrated values (216-220), which may be predetermined, sensed by the sensors 108, and/or in accordance with derived values.

Figure 3:
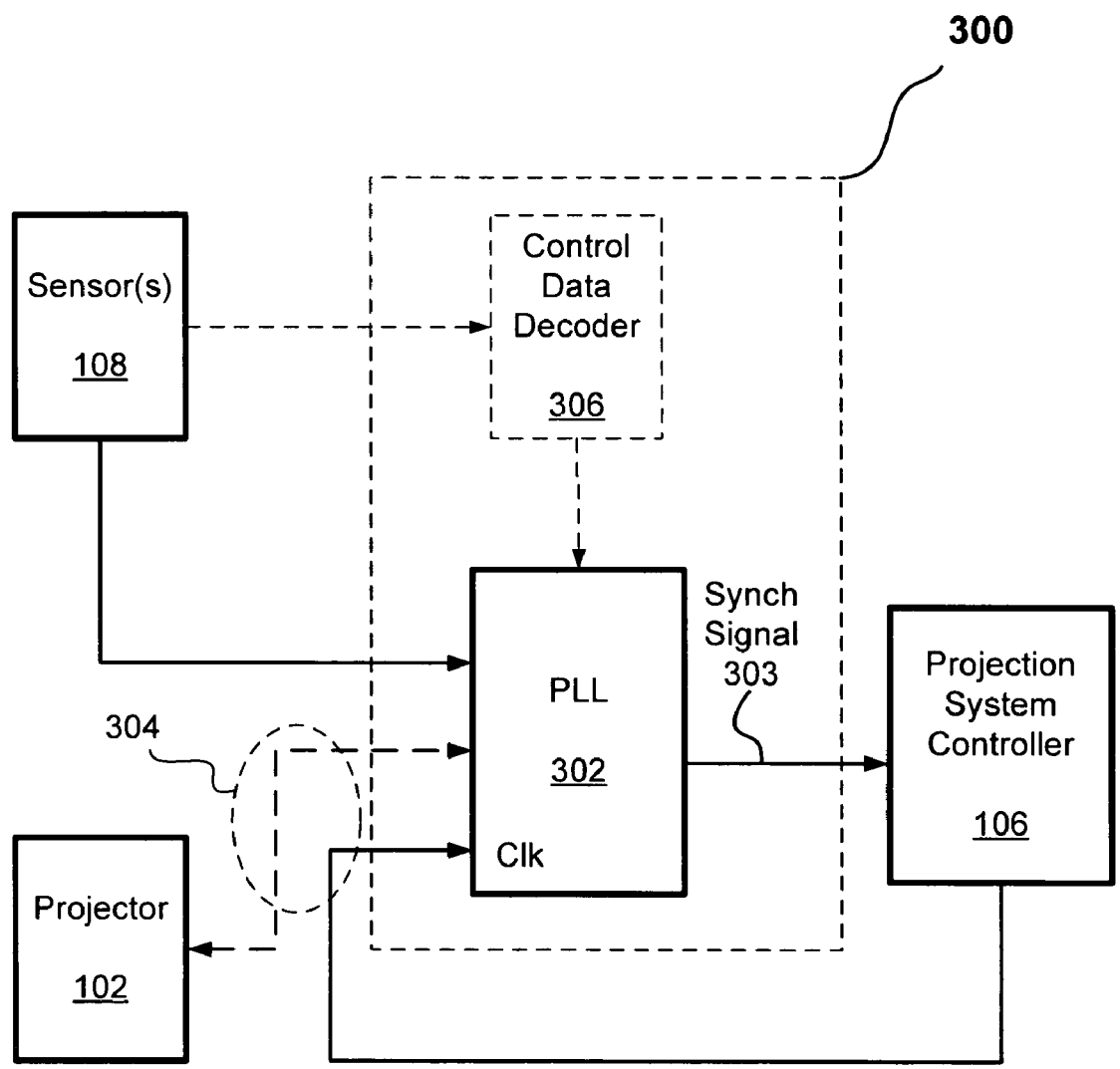
FIG. 3 illustrates a sample block diagram of a synchronization circuit, according to an embodiment.

FIG. 3 illustrates a sample block diagram of a synchronization circuit 300, according to an embodiment. The circuit 300 may be utilized to provide the synchronizer 109 discussed with reference to FIGS. 1-2, in one embodiment. The circuit 300 may include a phase-locked loop (PLL) 302. The PLL 302 may be any suitable PLL such as a digital or analog PLL.

As shown in FIG. 3, the PLL 302 may be coupled to the sensors 108 (e.g., to receive data regarding light incident on the sensors 108 such as discussed with reference to FIGS. 1-2). For example, three sensors (such as sensors 210-214 of FIG. 2) may be utilized to provide signals corresponding to various color content projected on the screen 104 of FIG. 1. The PLL 302 may operate to achieve phase lock between the signals received from the sensors 108. For example, the synch signal 303 may be phase locked to one or more of the sensor signals, e.g., such as the signal from the red sensor (e.g., sensor 210 of FIG. 2) to determine start of frame. The synch signal 303 may also achieve phase lock based on one or more qualification signals 304. For example, the start of frame may qualify each sequence of RGB colors and the PLL 302 may provide the synch signal 303 based on the start of frame and sensor signals, such as a red sensor signal. In the event there is a missing red sensor signal or start of frame or both, the synch signal 303 may continue to be provided until the missing signals reoccur to update the phase lock. An alternate clock signal from the projection system controller 106 can also provide the qualification signals 304 to provide the phase lock. A qualification signal (304), such as a start of frame signal, may be received through a wired or wireless connection to the projector 102 and/or a clock (or timing) signal from the projection system controller 106 (such as illustrated in FIG. 3). The output of the PLL 302 may be utilized to synchronize the operation of the projection system controller 106 with the projector 102 as discussed with reference to FIG. 2. For example, the projector 102 may include a rotating color wheel (or time sequenced color from an LCD projector) having various segments such as a red segment, a green segment, a blue segment, and the like. As the color wheel rotates, its red, green, and blue segments filter the light rays originating from a visible light source (such as a projector lamp) to project a color image on the screen (104). The circuit 300 provides timing information to the projection system controller 106 regarding the color wheel, which may be provided through various suitable sensing mechanisms and communicated wirelessly, optically, or in a hardwired fashion, for example, based on data from the sensors 108 and/or from the projector 102. As a result, the optical characteristic of the screen 104 of FIG. 1 may be modified in synchronization with the projected images.

In one embodiment, the PLL 302 reduces the effects of signal propagation delays or skews present in the system 100 of FIG. 1 (e.g., between the output provided by projector 102 and the reflectivity state of screen 104, between the reflectivity state of screen 102 and signals provided by projection system controller 106, within the projection system controller 106, within elements of the screen 104, or the like). Hence, the PLL 302 may be utilized to lock to start of a frame, or each color segment, in order to reduce delays in the system and to anticipate the next start of frame or color segment. This may allow utilization of the system 100 in larger environments (e.g., with additional delays due to the larger distances), larger screens (104), and/or where signals may be interrupted, e.g., when somebody walks between the projector 102 and the sensors 108, blocking transmission of signals.

Also, the circuit 300 may, in some embodiments but not in others, include a control data decoder 306 that may be coupled to the sensors 108. The decoder 306 may extract various control data from the signal(s) provided by the sensors 108 (e.g., control data that is originating from the projector 102) and provide the control data to the PLL 302, for example, to control an offset (e.g., offset for the output of the PLL 302), sampling period (e.g., the period over which the PLL 302 is to consider the value of the qualification signals 304), or the like. Hence, the projector 102 may encode various control data within its projections. In one embodiment, the control data may be embedded in signals non-visible to an unaided human eye, such as within UV, IR, RF, or the like carrier waves. Hence, the sensors 108 may include sensors capable of detecting such non-visible signals.

Figure 4A:
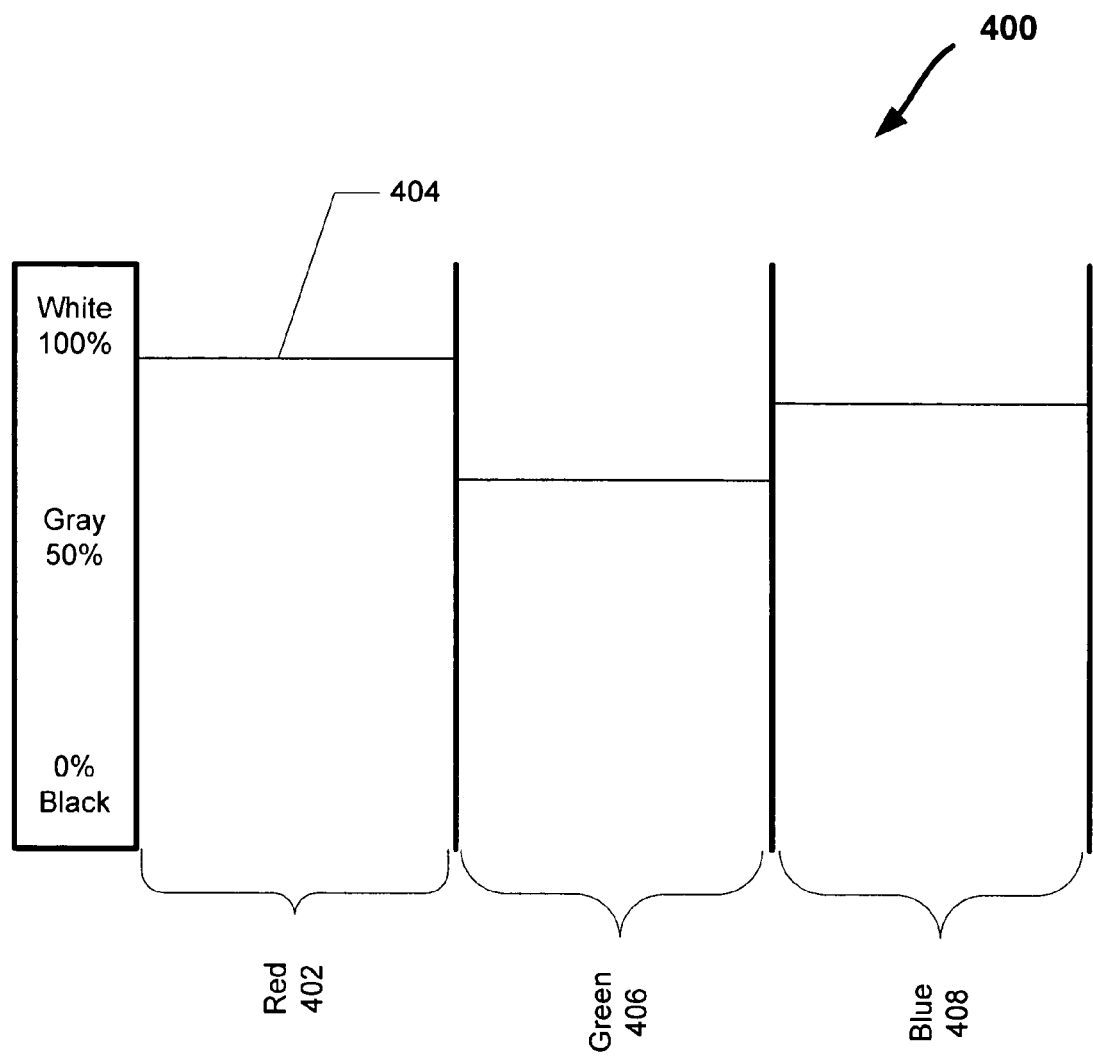
FIGS. 4A, 4B, and 4C illustrate embodiments of sample graphs, according to various embodiments.

FIG. 4A illustrates a sample graph 400 of reflectivity of a screen versus the color segment timing, according to an embodiment. In an embodiment, the graph 400 illustrates the reflectivity of the screen 104 of FIG. 1 versus the color segment timing of the projector 102 of FIG. 1. As shown in FIG. 4A, the screen reflectivity (or the absorbance) may change (e.g., per frame) and be scaled depending upon the spectrum and intensity of the light (ambient and/or projected) incident on the sensors (108). For example, during a red color segment 402, the reflectivity 404 (or the absorbance) of the screen 104 may be higher (or lower) than the screen reflectivity during a green segment (406) and a blue segment (408). Also, the screen reflectivity during the blue segment (408) may be higher (or lower) than during the green segment (406). Hence, the optical characteristic of the screen 104 (e.g., reflectivity and/or absorbance) may be adjusted (or held) over more than a single segment of the color wheel timing, e.g., not just within the given color segment.

Figure 4B:
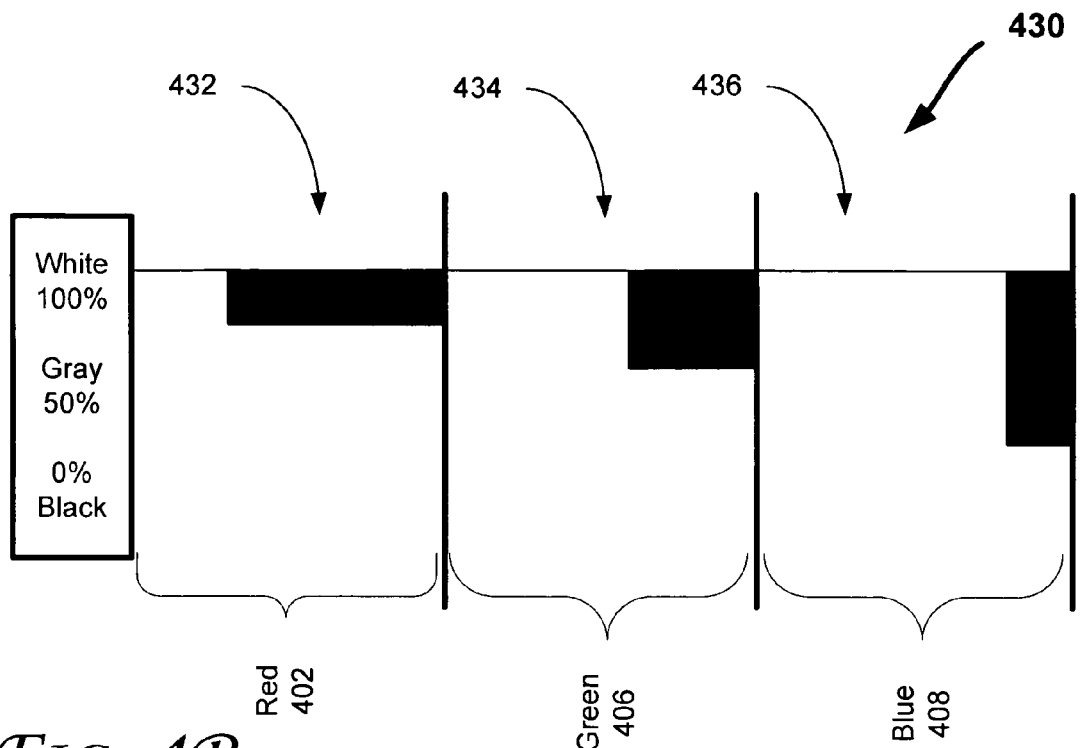

FIG. 4B illustrates an embodiment of a graph 430 showing the reflectivity of a screen versus the color segment timing. In an embodiment, the graph 430 illustrates the reflectivity of the screen 104 of FIG. 1 versus the color segment timing of the projector 102 of FIG. 1. As shown in FIG. 4B, the screen reflectivity (or the absorbance) may change for each color segment (402-408) in amplitude and duration. For example, the red color segment (402) may have a relatively longer duration of reflectivity below 100% (432) when compared with the green color segment 406. Similarly, the green color segment (406) may have a relatively longer duration of reflectivity below 100% (434) when compared with the blue color segment 408. Hence, the reflectivity (or absorbance) of the screen 104 may be changed both in amplitude and duration for each color segment (402-408). In an embodiment, control of the screen 104 for each color segment may be provided by combining synch signals from synchronization circuit 300 and corresponding amplitude and duration from each color sensor 108 to determine screen control settings.

Figure 4C:
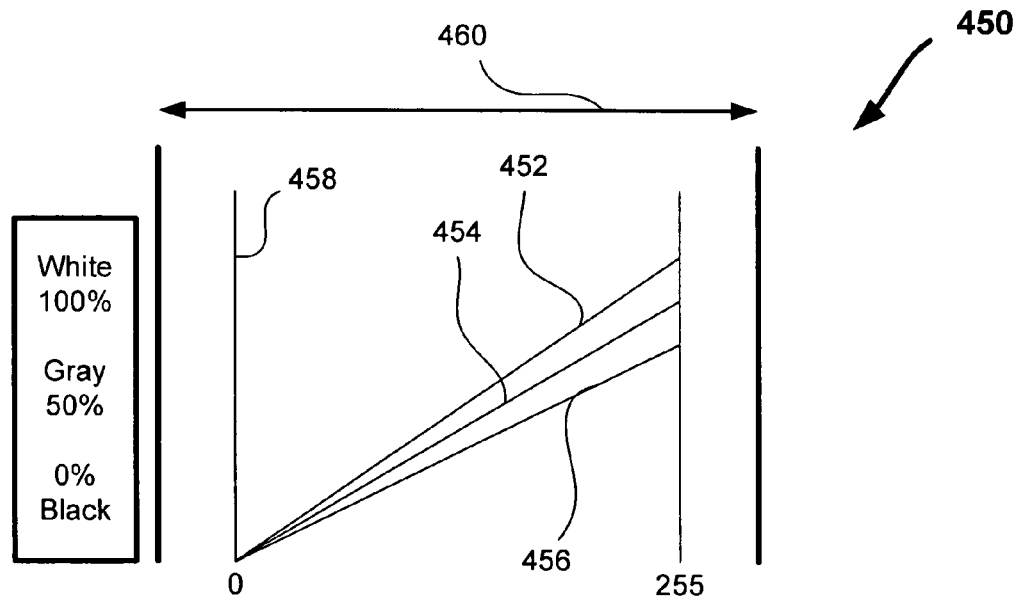

FIG. 4C illustrates an embodiment of a three-color overlay graph 450. The x-axis of graph 450 represents the normalized scaled input from minimum to maximum (e.g., 0-255 for 8 bit scale) for red, green, and blue. The y-axis represents the resulting intensity output to a viewer of the screen. The actual times for each color are fixed by the color wheel segments which are typically unique for each manufacturer and each color representing the color contribution for the system. The graph 450 shows that scaling by color (e.g., such as discussed with reference to FIG. 4A) may effect the screen reflectivity (or absorbance) with each color segment. In an embodiment, the graph 450 illustrates the resulting three-color overlay corresponding to changes in reflectivity of the screen 104 of FIG. 1. The graph 450 overlays the color contribution of red (452), blue (454), and green (456) over gray level bits 0 through max (e.g., 256 levels for an 8-bit grayscale intensity of the screen 104). For example, the gray level at 255 of blue (454) is less than the gray level at 255 of red (452) and the gray level 255 of green (456) is less than the gray level at 255 of blue (454). Moreover, as illustrated in FIG. 4C, spoke timing 458 may be shorter than typical color segment timing 460 of a projector (e.g., the projector 102 of FIG. 1). In one embodiment, control of the screen 104 for each color segment may be provided by combining synch signals from synchronization circuit 300 and corresponding amplitude and duration from each color sensor 108 to determine screen control settings.

Figure 5:
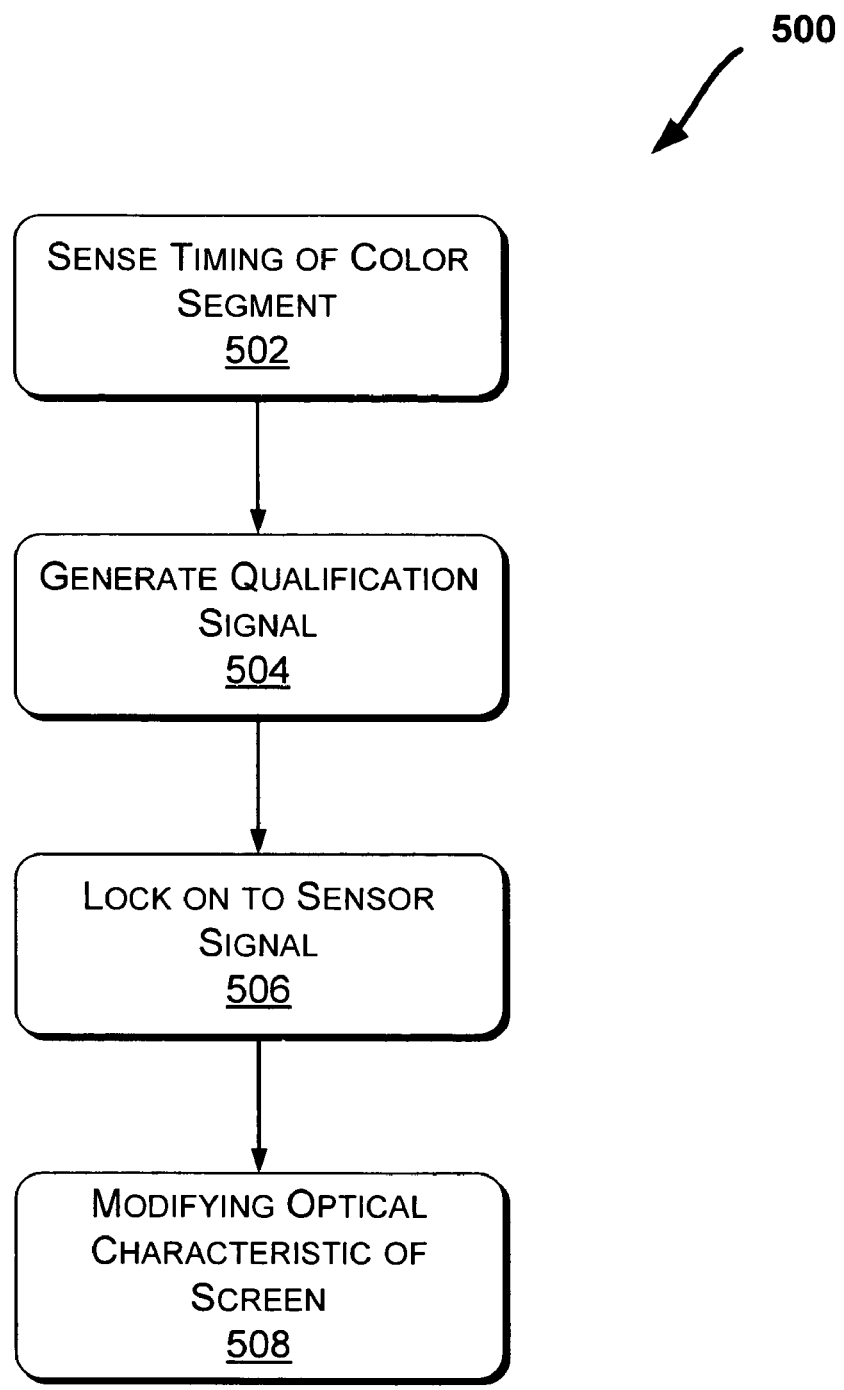
FIG. 5 illustrates an embodiment of a method for synchronizing modification of an optical characteristic of a screen, according to an embodiment.

FIG. 5 illustrates an embodiment of a method 500 for synchronizing modification of an optical characteristic of a screen, according to an embodiment. For example, the method 500 may be utilized to synchronize the optical characteristic (e.g., reflectivity and/or absorbance) modification of the screen 104 of FIG. 1 based on a color projected on the screen, such as discussed with reference to FIGS. 2-3.

Referring to FIGS. 1-5, the timing of the color segment (with or without the projected light) is sensed (502), e.g., by utilizing one or more sensors (108). For examples, data from a sensor (e.g., 108) may be utilized by the synchronizer (109) to determine when to modify an optical characteristic of a screen (104) by a controller. At an operation 504, the qualification signal (304) may be generated based on a clock of the controller, such as a projection system controller 106. The qualification signal (304) may alternatively be generated based on a color wheel timing of the projector 102. Further, as discussed with reference to FIG. 3, a PLL (302) may be used to lock onto a signal provided by the sensor (108) based on the qualification signal (304) at an operation 506. The PLL 302 may operate to achieve phase lock between the signals received from the sensors 108. For example, the synch signal 303 may be phase locked to one or more of the signals from the sensors, such as the signal from the red sensor (e.g., red sensor 210 of FIG. 2) to determine start of frame. The synch signal 303 may also achieve phase lock based on one or more qualification signals 304. For example, the start of frame can qualify each sequence of RGB colors and the PLL 302 may provide the synch signal 303 based on the start of frame and sensor signals, such as a signal from a red sensor (e.g., the red sensor 210 of FIG. 2). In the event there is a missing red sensor signal or start of frame or both, the synch signal may continue to be provided until the missing signals reoccur to update the phase lock. An alternate clock signal from the projection system controller 106 can also provide the qualification signal (304) to provide the phase lock. Hence, the method 500 may be utilized to synchronize an optical characteristic modification of a screen (104) based on a timing of a color component of light incident on a sensor (108) and a qualification signal (304).

At an operation 508, an optical characteristic of the screen (104) may be modified based on the intensity of the light incident on the sensors 108. As discussed with reference to FIG. 2, the reflectivity or absorbance of the screen (104) may be modified to compensate for color contamination of the screen (e.g., based on ambient light) and/or the aging of the components of the projector 102 of FIG. 1. Also, as discussed with reference to FIG. 2, the modification of the optical characteristic may be applied to portions or all pixels of the screen (104).

In one embodiment, the system 100 may include one or more processor(s) (e.g., microprocessors, controllers, etc.) to process various instructions to control the operation of the screen (104), the projector (102), the sensors (108), the synchronizer (109), and/or the projection system controller (106). The system 100 may also include a memory (such as read-only memory (ROM) and/or random-access memory (RAM)), a disk drive, a floppy disk drive, and a compact disk read-only memory (CD-ROM) and/or digital video disk (DVD) drive, which may provide data storage mechanisms for the color peak reference module 226 of FIG. 2.

One or more application program(s) and an operating system may also be utilized which can be stored in non-volatile memory (such as the memory discussed with reference to 226 of FIG. 2) and executed on the processor(s) discussed above to provide a runtime environment in which the application program(s) can run or execute.

Some embodiments discussed herein (such as those discussed with reference to FIGS. 1-5) may include various operations. These operations may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or machine-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method comprising:
   controlling a timing of modifying an optical characteristic of a projection screen using (1) a timing of a color component of light incident on a sensor, the light including ambient light and projected light forming an image on the projection screen, and (2) a signal related to a timing of the projected light.

2. The method of claim 1, wherein the controlling comprises utilizing a phase-locked loop to achieve phase lock of a synchronizing signal to a signal provided by the sensor based on the signal.

3. The method of claim 1, further comprising generating the signal using a clock of a projection system controller.

4. The method of claim 1, further comprising generating the signal using a color wheel timing of a projector.

5. The method of claim 1, wherein the optical characteristic is one of a reflectivity and an absorbance.

6. The method of claim 1, further comprising determining a peak of an intensity of a plurality of colors of the light incident on the sensor.

7. The method of claim 1, wherein, the light comprises projected light.

8. The method of claim 1, wherein, the modifying the optical characteristic comprises modifying the optical characteristic of all pixels of the screen.

9. The method of claim 1, further comprising adjusting one of reflectivity, absorbance, or transmissiveness for time intervals corresponding to red, green, and blue segments of a color wheel of a projector according to the controlling.

10. The method of claim 1, further comprising modifying one of reflectivity, absorbance, or transmissiveness of the screen over a portion of a color segment time interval of a projector to achieve a desired average of the optical characteristic over the segment interval.

11. The method of claim 1 further comprising reflecting both the projected light and ambient light from the screen.

12. The method of claim 11 further comprising controlling the optical characteristic of the screen based additionally upon sensed color content of ambient light.

13. An apparatus comprising:
   a screen having an adjustable optical characteristic;
   a sensor to provide a sensor signal indicating timing of a color component of light; and
   a circuit to generate a synchronization signal using the sensor signal to synchronize adjustment of the optical characteristic with the timing of the color component.

14. The apparatus of claim 13, wherein the synchronizer comprises a phase-locked loop coupled to receive the sensor signal and a qualification signal.

15. The apparatus of claim 13, further comprising a controller to generate a qualification signal using a clock signal provided by the projection system controller.

16. The apparatus of claim 13, further comprising a projector to generate a qualification signal according to timing of segments of a color wheel.

17. The apparatus of claim 13, wherein the screen is a projection screen selected from a group comprising a rear projection screen and a front projection screen.

18. The apparatus of claim 13, wherein the sensor comprises a plurality of sensors, wherein each of the plurality of sensors corresponds to a primary color.

19. The apparatus of claim 13, further comprising a projector to project at least a portion of the light on the screen.

20. The apparatus of claim 13, further comprising a projection system controller to adjust one of a reflectivity, absorbance, or transmissiveness of the screen to compensate for ambient light.

21. The apparatus of claim 13, further comprising a control data decoder to extract control data from the sensor signal.

22. The apparatus of claim 21, wherein the control data is one or more of an offset or a sampling period.

23. The apparatus of claim 13, wherein the sensor is configured to sense ambient light impinging the screen.

24. A computer-readable medium comprising:
   stored instructions to synchronize modification of an optical characteristic of a projection screen with a timing of a change between color components of light of an image incident on the screen, wherein the synchronizing uses a timing of a color component of light incident on a sensor and a signal related to a timing of projected light.

25. The computer-readable medium of claim 24, further comprising stored instructions to modify the optical characteristic of all pixels of the screen.

26. The computer-readable medium of claim 24, further comprising stored instructions to modify the optical characteristic of the screen in response to data provided by the sensor.

27. An apparatus comprising:
means for sensing an occurrence of a color component of light; and
means for synchronizing an optical characteristic modification of a screen based on a qualification signal and the occurrence of the color component of light.

28. The apparatus of claim 27, further comprising means for locking onto a signal provided by the sensor.

29. The apparatus of claim 27, further comprising means for modifying the optical characteristic of the screen in response to an ambient light contribution.

* * * * *